Aug. 22, 1933.   C. PEARSON   1,923,952
TRACTOR MOWER
Filed April 22, 1932   2 Sheets-Sheet 1

Inventor
Charles Pearson
By M. P. Doolittle
Atty.

Aug. 22, 1933.                C. PEARSON                1,923,952
                              TRACTOR MOWER
                         Filed April 22, 1932         2 Sheets-Sheet 2
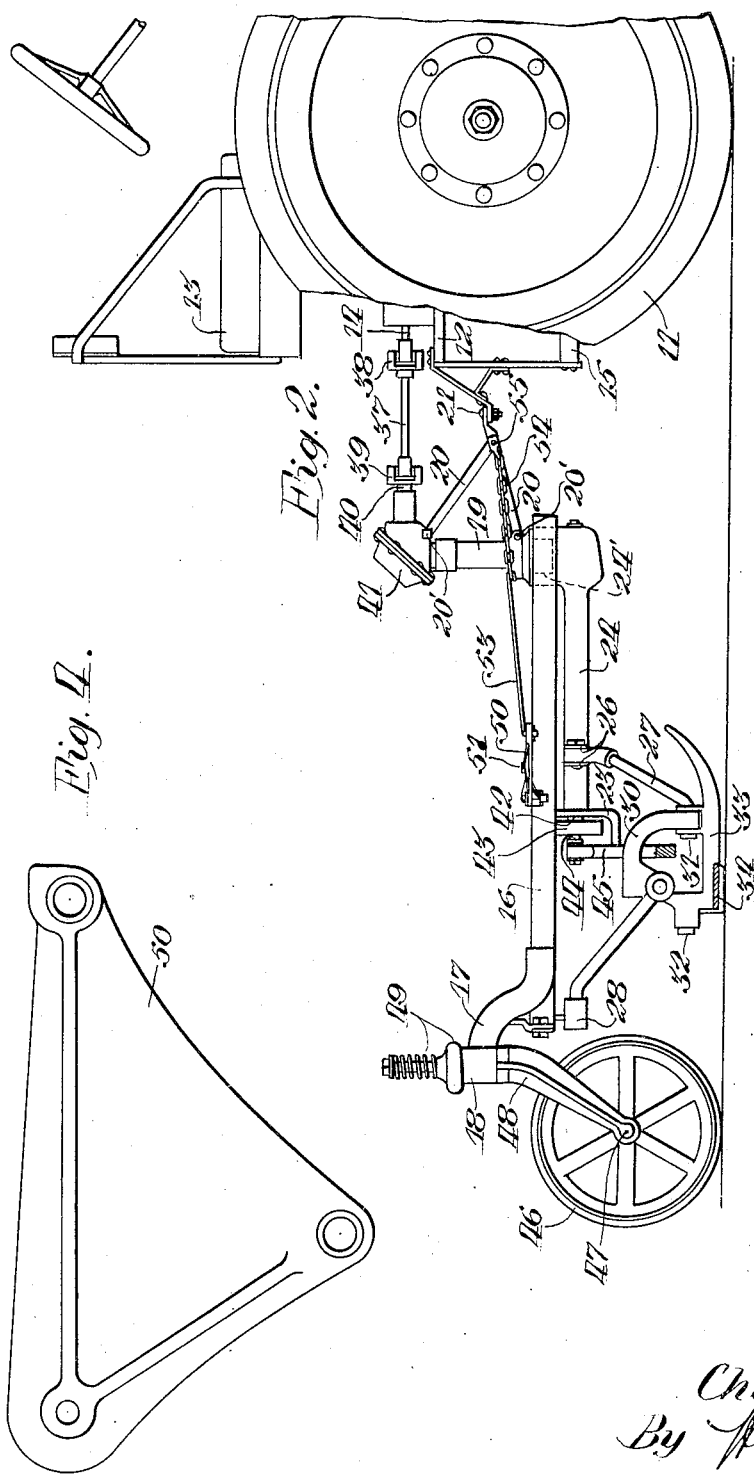
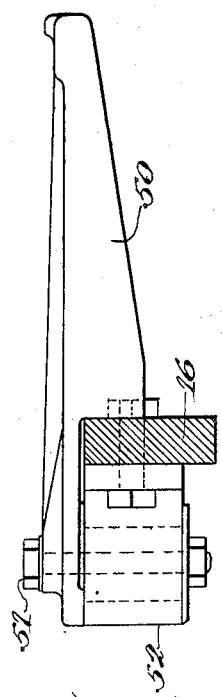
Inventor
Charles Pearson Patented Aug. 22, 1933

1,923,952

UNITED STATES PATENT OFFICE 1,923,952

TRACTOR MOWER

Charles Pearson, Cicero, Ill., assignor to International Harvester Company, a Corporation of New Jersey Application April 22, 1932. Serial No. 606,772

12 Claims. (Cl. 56—25)

This invention relates to an improvement in mowing machines of the type disclosed in my United States Patent No. 1,757,214 issued May 6, 1930. Such mower is connected to the drawbar of a tractor to trail therebehind, the entire frame of the mower attachment, which happens to be in triangular form, being pivotally swingable from its apex to move laterally when the transversely extending cutter bar strike and obstruction with sufficient impact to cause the frame to so swing; the force of such impact being transmitted through the frame to free normally locked wheel supports to caster and carry the frame swingably, as described, thereby preventing damage to the cutter bar and its mechanism.

In practice, it has been found, when the cutter bar of such a mower is working through a heavy cutting, that said bar loses its lead and objectionably lags behind its proper transverse operating line. When the cutter bar lags, its cutting mechanism does not efficiently function and accordingly the principal object of this invention is to provide means to prevent such lagging.

Other objects and advantages of the structure of this invention will be apparent to those skilled in this art as the disclosure progresses.

Briefly, these desirable objects are achieved in a mower attachment designed for use with a tractor having a draw element and a power take-off, said mower attachment comprising a frame, the front center part of which includes a frame part and connection rigidly connected to the draw element of the tractor whereby to draw the frame, and support it at its forward end. The rear end of the frame is supported on carrying wheels, which rear part of the frame is pivotally mounted on the part rigidly connected to the tractor draw element. The frame pivotally carries a laterally extending coupling arm which in turn is connected to the cutter bar, which cutter bar is arranged on a line in advance of said carrying wheels. Means is provided in the mounting for these carrying wheels, which causes them normally to be locked against castering, which means, however, becomes automatically unlocked, should the bar encounter an obstruction, with a predetermined force sufficient to twist the frame and cause said wheels to caster to relieve the resistance of the obstruction, to prevent injury to the cutter bar and its cutting mechanism. The frame carries a longitudinal casing in which is enclosed a shaft having a connection for driving the cutting mechanism. The other end of this shaft is connected to an upright shaft carried in an upright housing or standard, the upright shaft therein, in turn, being driven from the tractor power take-off. The gear connections are such that power is evenly transmitted from the power take-off shaft to the cutting mechanism, regardless of the angular disposition of the mower attachment with respect to the tractor.

As such cutter bar has a tendency to lag in cutting heavy crops, means, preferably in the form of a spring, is interconnected between the frame and tractor drawbar to exert a force which prevents and overcomes the lagging tendency. Such means, however, does not interfere with the swinging movement of the frame when the cutter bar strikes an obstruction, as above explained.

Looking now to the several sheets of drawings illustrating one example which the invention may assume in practice:

Figure 2 is a side view;

Figure 3 is a sectional view of a bell crank bracket, as seen along line 3—3 shown in Figure 1; and, Figure 4 is a plan view of said bracket.

Figure 1:
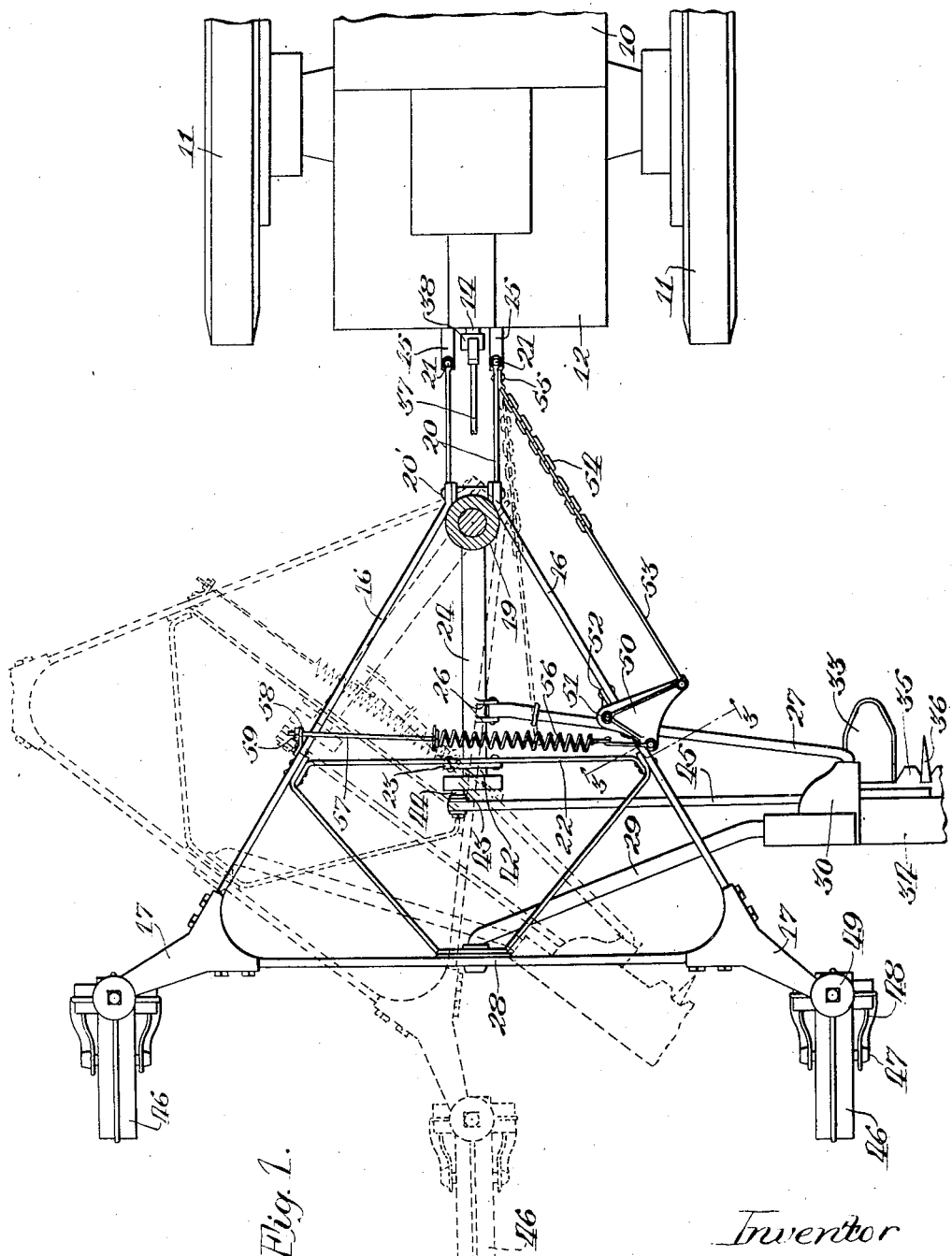
Figure 1 is a plan view of a tractor and trailer mower, partly in section, embodying the lag prevention mechanism.

The tractor may be any standard tractor, such as the industrial tractor shown, having a body 10, carrying wheels 11, operator's platform 12, operator's seat 13, power take-off shaft 14, and a draw element, such as the bars 15.

The improved mower attachment in the form herein shown comprises a triangular main frame 16, the sides of which are connected at the rear by brackets 17, each of which embodies a vertically disposed collar part 18. The converged portion or apex at the front end of the frame carries an upright housing or standard 19, which standard rigidly carries adjacent its lower end, or just above the main frame 16, a pair of drawbars 20 which are each detachably connected by pins 21 at spaced points to the draw element 15 on the tractor. It is to be understood that these bars 20 are bolted to the upright housing part at 20' and thus connect to the standard 19 in a manner to make the part 19 in effect a part of the tractor, as can be seen.

The main frame includes a transverse cross brace 22 which centrally carries a depending bracket 23 for supporting a longitudinal and centrally disposed, nonrotatable housing 24 pivotally connected, as best shown in Figure 2, with the upright standard housing 19 at its lower end by means of a loose, turnable connection 24'. The piece 22 carries a pair of apertured ears 26 formed with the housing 24, said ears pivotally carrying a grasswardly extending coupling rod 27. In longitudinal alignment with the housing 24 the rear side of the main frame carries a bracket 28 for pivotally mounting a grasswardly extending coupling arm or bar 29, said bar rockably carrying at its free end a conventional coupling yoke 30, to which is pivotally connected a coupling shoe 33, by means of an angularly bent end 31 on the rod 27 and a pin 32. This coupling shoe 33 carries in the usual manner a cutter bar 34 provided with the usual cutter mechanism 35 operable between guards 36.

Such cutter bar and cutting mechanism may be conventionally tilted through the medium of any suitable tilt lever mechanism, not shown, and also in any standard lever controlled way, the bar may be vertically adjusted.

The cutting mechanism 35 is designed to be power driven from the take-off shaft 14 of the tractor. It will be noted that this take-off 14 is connected to a shaft 37 by means of a universal knuckle 38, and, by means of a knuckle 39 at its other end, is connected to a shaft 40 which is journaled for rotation in a gear box 41 formed at the top end of the standard 19. Enclosed in the box 41 is suitable gearing to drive a shaft in the standard 19, not shown, in turn appropriately geared to drive a shaft 42 extending rearwardly through the housing 24, said protruded end of the shaft 42 carrying a flywheel 43 having an eccentric pin 44, to which is operatively connected a pitman 45, having at its grassward end the usual connection with the sickle 35 to reciprocate the same for cutting the crop.

As mower outfits pulled by a tractor are run at a relatively high rate of speed, great injury would be caused the cutter bar and its mechanism, should the same encounter an obstruction. Such obstructions are frequently encountered before the operator can throw his tractor out of gear to save the mower bar from injury. This structure includes means for safe-guarding the cutter bar and its mechanism under such conditions.

The rear corners or angles of the triangular mower frame are supported on a pair of trailing wheels 46. As the mounting for each of these wheels is identical, it will be sufficient to describe merely one of them. Each wheel is carried on a transverse pin 47, the pin being locked in the bifurcations of a yoke 48, which yoke extends forwardly and upwardly where its parts join to form a spindle loose in the collar 18 on the bracket 17. As described in the prior patent mentioned, a spring pressed, releasable lock mechanism 49 is associated with each spindle normally to hold the wheels 46 against castering movement. However, when the cutter bar strikes an obstruction with sufficient impact, the spring pressed lock structure automatically releases, due to the torque developed through the frame 16 under the force of the shock, to free the wheels for castering movement, whereupon the whole frame 16 swings stubblewardly to the dotted line position shown in Figure 1, the turning movement being made possible through the turn connections between the parts 24, 24' at the front apex of the triangular frame 16. Thus, the cutter bar is relieved to prevent damage thereto.

As has previously been stated, the main object of this invention was to provide means to prevent in a mower of this type objectionable lagging of the cutter bar.

Such mechanism has accordingly been provided, the same embodying a bell crank or triangularly shaped bracket 50 pivoted about a vertical axis 51 on a bracket 52 appropriately bolted in a position on the grassward side of the triangular frame 16. One arm of this bracket 50 has connected to it a pull rod 53 having connection with a flexible element in the form of a chain 54 anchored to a bracket 55 secured to one of the drawbars 20 on the tractor 10, such point of securement, it being noted, arranged forwardly of the turning pivot 24' for the mower attachment. The other arm of the bracket 50 has connected to it one or more pull springs 56 connected by a rod 57 to a bracket 58 mounted appropriately on the stubbleward side of the mower frame 16, the end of said rod 57 being threaded and carrying a nut 59 to enable adjustment of the tension for the spring 56. The transversely disposed spring structure 56 is so arranged that it exerts a force through the pull structure 53—54 and the bracket 50, urging the mower frame 16 in a grainward direction to maintain the proper lead of the cutter bar 34, so that the same cannot lag in heavy cutting or under similar conditions. This spring structure 56 is so proportioned in its pulling effect with respect to greater forces encountered by the cutter bar when it strikes an obstruction, such as a stump, as not to interfere with the operation of the wheels 46 to cause the frame to swing stubblewardly, as shown in the dotted lines in Figure 1, to prevent damage to the cutter bar. Further, such swinging of the frame in no way alters or affects the lag preventing mechanism as the pull structure 53—54 moves over to lie closely adjacent the pivotal point for the tractor frame, as shown in the dotted lines. After the mower frame has been displaced in the manner indicated in the dotted lines, the spring lag preventing feature 56 is also operative to help restore the mower to its proper trailing position with respect to the tractor.

The operation of the mower is like that described in my previous patent heretofore mentioned, with the exception of the lag preventing feature, which in the manner described exerts a force to maintain the cutter bar in its proper transverse position.

From this disclosure it will now be apparent that structure has been provided for a mower of this type to prevent lagging of the cutter bar in accordance with the objects of the invention heretofore recited.

It is the intention to cover herein all such changes and modifications of the illustrative example shown which do not depart materially from the spirit and scope of the invention as set forth in the following claims.

What is claimed is:

1. A mower attachment for tractors comprising a trailing mower having a frame adapted to be connected to a tractor, a cutter bar extending laterally from the mower frame, and means connected to said frame and adapted for connection to the tractor to prevent lagging of the cutter bar, said means embodying a resilient portion and another portion that is flexible.

2. A mower attachment for tractors comprising a wheel supported trailing mower having a frame adapted to be pivotally connected to a tractor, a cutter bar connected to and extending laterally of the frame, means carried by the frame to maintain the lead of the cutter bar, said means including a pull element adapted for connection to the tractor.

3. A mower attachment for tractors comprising a wheel supported trailing mower having a frame adapted to be pivotally connected to a tractor, a cutter bar connected to and extending laterally of the frame, resilient means carried by the frame to prevent lagging of the cutter bar, and a pull connection between said means and the tractor.

4. A mower attachment for tractors comprising a wheel supported trailing mower having a frame adapted to be pivotally connected to a tractor, a cutter bar connected to and extending laterally of the frame, spring means carried by the frame to maintain the lead of the cutter bar, said means including a pull element having a flexible portion adapted for connection to the tractor.

5. A trailing mower attachment for tractors having a draw element, said mower comprising a triangular frame with its apex adapted for connection to and to be supported by said draw element, a cutter bar connected to and extending transversely of the frame, carrying wheels for the rear end of the frame, and means preventing lag of the cutter bar in its cutting position, said means comprising a spring structure connected between the frame and the tractor.

6. A trailing mower attachment for tractors having a draw element, said mower comprising a triangular frame with its apex adapted for connection to and to be supported by said draw element, a cutter bar connected to and extending transversely of the frame, carrying wheels for the rear end of the frame, means normally locking said wheels against castering, said means being automatically releasable when the cutter bar strikes an obstruction with a predetermined force to cause the said wheels to caster and to carry the mower frame laterally to prevent damage to the cutter bar, and means to prevent lag of the cutter bar in its cutting position.

7. A trailing mower attachment for tractors having a draw element, said mower comprising a triangular frame with its apex adapted for connection to and to be supported by said draw element, a cutter bar connected to and extending transversely of the frame, carrying wheels for the rear end of the frame, means normally locking said wheels against castering, said means being automatically releasable when the cutter bar strikes an obstruction with a predetermined force to cause the said wheels to caster and to carry the mower frame laterally to prevent damage to the cutter bar, and means preventing lag of the cutter bar in its cutting position, said means comprising resilient pull means connected between the mower frame and the tractor.

8. A trailing mower attachment for tractors having a draw element, said mower comprising a triangular frame with its apex adapted for connection to and to be supported by said draw element, a cutter bar connected to and extending transversely of the frame, carrying wheels for the rear end of the frame, means normally locking said wheels against castering, said means being automatically releasable when the cutter bar strikes an obstruction with a predetermined force to cause the said wheels to caster and to carry the mower frame laterally to prevent damage to the cutter bar, means preventing lag of the cutter bar in its cutting position, said means comprising a spring device carried by the frame, a bell crank element pivotally carried on the frame to which one end of the spring device is connected, and a pull connection between the bell crank element and the tractor.

9. A trailing mower attachment for tractors having a draw element, said mower comprising a triangular frame with its apex adapted for connection to and to be supported by said draw element, a cutter bar connected to and extending transversely of the frame, carrying wheels for the rear end of the frame, means normally locking said wheels against castering, said means being automatically releasable when the cutter bar strikes an obstruction with a predetermined force to cause the said wheels to caster and to carry the mower frame laterally to prevent damage to the cutter bar, means preventing lag of the cutter bar in its cutting position, said means comprising a spring carried and disposed transversely of the frame, a bell crank element pivotally carried on the grassward side of the frame to which one end of the spring is connected, and a pull connection between the bell crank element and the tractor.

10. A trailing mower attachment for tractors having a draw element, said mower comprising a triangular frame with its apex adapted for connection to and to be supported by said draw element, a cutter bar connected to and extending transversely of the frame, carrying wheels for the rear end of the frame, means normally locking said wheels against castering, said means being automatically releasable when the cutter bar strikes an obstruction with a predetermined force to cause the said wheels to caster and to carry the mower frame laterally to prevent damage to the cutter bar, means preventing lag of the cutter bar in its cutting position, said means comprising a spring carried by the frame, a bracket carried on the frame to which one end of the spring is connected, and a pull connection between the bracket and the tractor, said pull connection including a flexible portion.

11. A trailing mower attachment for tractors having a draw element, said mower comprising a triangular frame with its apex adapted for connection to and to be supported by said draw element, a cutter bar connected to and extending transversely of the frame, carrying wheels for the rear end of the frame, means preventing lag of the cutter bar in its cutting position, said means comprising a spring carried by the frame, a bell crank element pivotally carried on the frame to which one end of the spring is connected, and a flexible pull connection between the bell crank element and the tractor.

12. A trailing mower attachment for tractors having a draw element, said mower comprising a triangular frame with its apex adapted for connection to and to be supported by said draw element, a cutter bar connected to and extending transversely of the frame, carrying wheels for the rear end of the frame, resilient means on the frame to prevent lag of the cutter bar in its cutting position, a bell crank element pivotally carried on the frame to which one end of the resilient means is connected, and a pull connection between the bell crank element and the tractor.

CHARLES PEARSON.